US008956213B2

(12) United States Patent
Manz et al.

(10) Patent No.: US 8,956,213 B2
(45) Date of Patent: Feb. 17, 2015

(54) GAMES AND GAMING MACHINES HAVING WHEEL FEATURES

(71) Applicant: Rocket Gaming Systems, LLC, Las Vegas, NV (US)

(72) Inventors: Robert Manz, Las Vegas, NV (US); Terry Daly, Las Vegas, NV (US); Robert DelRossi, Las Vegas, NV (US); Erica Frohm, Evanston, IL (US); Charlie Lombardo, Henderson, NV (US)

(73) Assignee: Rocket Gaming Systems, LLC, Las Vegas, NV (US)

( * ) Notice: Subject to any disclaimer, the term of this patent is extended or adjusted under 35 U.S.C. 154(b) by 0 days.

(21) Appl. No.: 14/059,798

(22) Filed: Oct. 22, 2013

(65) Prior Publication Data

US 2014/0113697 A1 Apr. 24, 2014

Related U.S. Application Data

(63) Continuation-in-part of application No. 12/984,426, filed on Jan. 4, 2011, now abandoned.

(60) Provisional application No. 61/335,641, filed on Jan. 7, 2010.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/34*** | (2006.01) |

(52) U.S. Cl.
CPC .. *G07F 17/34* (2013.01); *A63F 9/24* (2013.01)
USPC .................... 463/19; 463/16; 463/21; 463/25

(58) Field of Classification Search
USPC .......................................... 463/16, 19, 21, 25
See application file for complete search history.

(56) References Cited

U.S. PATENT DOCUMENTS

| | | | |
|---|---|---|---|
| 5,292,127 | A | 3/1994 | Kelly et al. |
| 5,318,298 | A | 6/1994 | Kelly et al. |
| 5,409,225 | A | 4/1995 | Kelly et al. |
| 5,584,763 | A | 12/1996 | Kelly et al. |
| 5,700,007 | A | 12/1997 | Kelly et al. |
| 5,722,891 | A | 3/1998 | Inoue |
| 5,743,523 | A | 4/1998 | Kelly et al. |
| 5,788,573 | A | 8/1998 | Baerlocher et al. |
| 5,848,932 | A | 12/1998 | Adams |
| 5,967,514 | A | 10/1999 | Kelly et al. |
| 6,089,978 | A | 7/2000 | Adams |
| 6,244,595 | B1 | 6/2001 | Kelly et al. |
| 6,334,814 | B1 | 1/2002 | Adams |
| 6,446,964 | B1 | 9/2002 | Kelly et al. |
| 6,491,296 | B2 | 12/2002 | Kelly et al. |
| 6,533,273 | B2 | 3/2003 | Cole et al. |
| 6,612,574 | B1 | 9/2003 | Cole et al. |

(Continued)

*Primary Examiner* — Adetokunbo O Torimiro
(74) *Attorney, Agent, or Firm* — Weide & Miller, Ltd.

(57) ABSTRACT

Gaming machines and games are configured with one or more wheel events or features. The wheel events or features may comprise main games or bonus games, or may comprise entertaining representations of outcomes of other games or events. The wheel events comprise the selection of one or more segments of a wheel having associated awards. Wheel events may have various entertaining configurations, including use of multiple wheels, concentric wheels and the like.

8 Claims, 4 Drawing Sheets

(56) References Cited

U.S. PATENT DOCUMENTS

| | | | |
|---|---|---|---|
| 6,612,575 | B1 | 9/2003 | Cole et al. |
| 6,663,488 | B1 | 12/2003 | Adams |
| 6,692,355 | B2 | 2/2004 | Baerlocher et al. |
| 6,827,646 | B2 | 12/2004 | Adams |
| 7,011,581 | B2 | 3/2006 | Cole et al. |
| 7,100,916 | B2 | 9/2006 | Kelly et al. |
| 7,235,011 | B2 | 6/2007 | Randall et al. |
| 7,278,635 | B2 | 10/2007 | Kelly et al. |
| 7,311,598 | B2 | 12/2007 | Kaminkow et al. |
| 7,322,886 | B2 | 1/2008 | Manz |
| 7,390,257 | B2 | 6/2008 | Paulsen et al. |
| 7,442,125 | B2 | 10/2008 | Paulsen et al. |
| 7,618,316 | B2 | 11/2009 | Cole et al. |
| 7,641,554 | B2 | 1/2010 | Paulsen et al. |
| 7,729,074 | B2 | 6/2010 | Venkataramani et al. |
| 8,460,082 | B2 | 6/2013 | Harris |
| 2002/0042294 | A1 | 4/2002 | Pau et al. |
| 2005/0059471 | A1 | 3/2005 | Cannon |
| 2005/0119039 | A1 * | 6/2005 | Berman et al. .................. 463/16 |
| 2005/0119042 | A1 | 6/2005 | Chamberlain et al. |
| 2007/0054723 | A1 | 3/2007 | Mattice et al. |
| 2007/0072668 | A1 | 3/2007 | Hein et al. |
| 2007/0117608 | A1 | 5/2007 | Roper et al. |
| 2009/0075715 | A1 | 3/2009 | Coleman et al. |

* cited by examiner

GAMES AND GAMING MACHINES HAVING WHEEL FEATURES

RELATED APPLICATION DATA

This application is a continuation in part of U.S. application Ser. No. 12/984,426, filed Jan. 4, 2011, which claims priority to U.S. Provisional Application Ser. No. 61/335,641, filed Jan. 7, 2010.

FIELD OF THE INVENTION

The present invention relates to wheel-type features for games and gaming machines.

BACKGROUND OF THE INVENTION

Various gaming machines and games include spinning wheel features. The wheel features may comprise a physical rotating reel or a video representation of a wheel. Because spinning reels have such great appeal, various gaming machines and wagering games have been developed which include such a feature.

Relative to gaming machines, the most common implementation of a spinning wheel is a bonus wheel feature. In this implementation, a gaming machine is configured to present a base game. Such a game might comprise a slot game. The slot game may have various winning outcomes with associated base awards. Certain outcomes may trigger activation of a bonus or secondary wheel. The bonus wheel may offer a bonus award in addition to a base award. Generally, the bonus wheel has a plurality of spaces or "slices", each of which bears a potential bonus award. The wheel spins and randomly stops at one of the spaces, thus resulting in a randomly selected bonus award for the player.

Game players continually seek new and exciting games. These games peak player interest, and thus also increase revenue for casinos. Thus, while existing spinning wheel game features are popular, they are old and not as exciting as they might be.

SUMMARY OF THE INVENTION

The invention comprises wheel features or events particularly suited for use with gaming machines and games. In one embodiment, the wheel features or events of the invention comprise wagering games, bonus events or are used to represent game outcomes.

The wheel features or events may be represented by the video display of wheel events or by use of mechanical and/or electro-mechanical wheels. For example, a gaming machine might include one or more displays for displaying a base game, such as a main video display or reels. The gaming machine might also include a secondary video display for displaying wheel events and/or a physical wheel.

The wheel events of the invention have various forms. Wheels may be used in various manners to display outcomes, such as credit awards. One or more wheels might bear various indicia or symbols, such as credit awards, multipliers, free spins, free games, jackpot wins or the like. The configuration of the wheel may vary, including during play. In addition, the symbols or awards may vary, including during play.

Various wheel features comprise use of multiple wheels or embedded wheels.

In a preferred embodiment, the wheel features are used as an entertaining display of all or part of an outcome of a bingo game. One or more bingo game outcomes are designated as winning outcomes. At least one winning outcome might comprise a game-ending winning outcome. At least one winning outcome may be an interim winning outcome, meaning that it does not end the game. The winning outcomes may comprise bingo card matching patterns. One or more awards may be associated with the winning outcomes, such as a number of credits. The winning outcomes and associated awards may be defined by a pay table for the bingo game. In one embodiment, a winning outcome may be represented wholly or in part by a wheel event.

The game may be implemented via an electronic gaming machine, such as in a gaming system including gaming machines linked to a central server. In such embodiments, bingo cards may be electronically displayed. However, the game might be implemented utilizing printed bingo cards. Further, principles of the invention may be applied to other games.

Further objects, features, and advantages of the present invention over the prior art will become apparent from the detailed description which follows, when considered with the figures provided herein.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises wheel events or features and methods of game play ("games") and gaming machines including such wheel events or features. The wheel events or features have applicability to various games and gaming machines. In one preferred embodiment, a wheel event or feature is used as an indicator or representation of a bingo game outcome or win.

Figure 1:
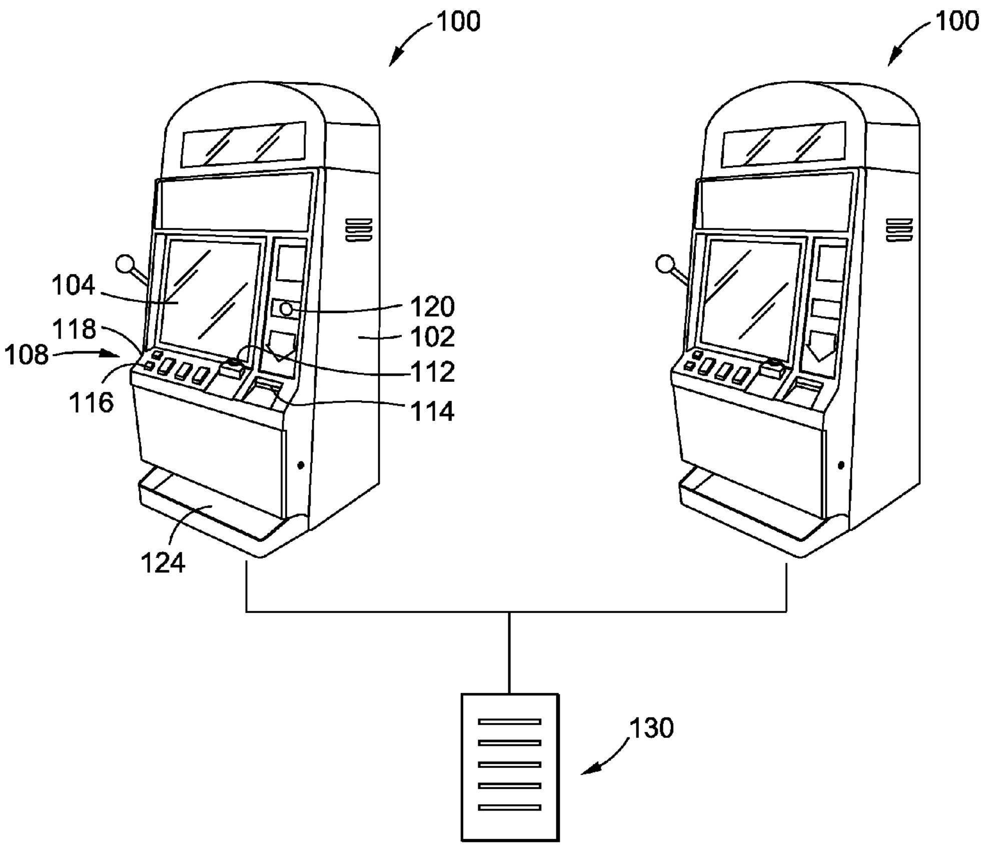
FIG. 1 illustrates gaming machines and a gaming system which may comprise an environment in which wheel features of the invention may be implemented.

FIG. 1 illustrates one embodiment of a gaming machine or device 100 which may be configured to include or present a wheel event or feature of the invention and at which a game having a wheel event or feature may be implemented. The gaming machine 100 might be located in various environments, such as a casino.

In one embodiment, the gaming machine 100 defines a generally enclosed interior space for housing one or more components. As illustrated, the gaming machine 100 generally comprises a housing or cabinet 102 for supporting and/or enclosing various components required for operation of the gaming machine. In the embodiment illustrated, the housing 102 includes a door located at a front thereof, the door capable of being moved between an open position which allows access to the interior, and a closed position in which access to the interior is generally prevented. The configuration of the gaming machine 100 may vary. In the embodiment illustrated, the gaming machine 100 has an "upright" configuration. However, the gaming machine 100 could have other configurations, shapes or dimensions (such as being of a "slant"-type, "bar-top" or other configuration as is well known to those of skill in the art).

The gaming machine 100 preferably includes at least one display device 104 configured to display game information. The display device 104 may be a mechanical, electro-mechanical or electronic display, such as one or more rotating reels, a video display or the like. When the display device 104 is an electronic video display, it may comprise a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display 104 may be capable of projecting or displaying a wide variety of information, including images, symbols and other indicia or information associated with game play, game promotion or other events. As detailed below, the gaming machine 100 may include one or more second or secondary display devices. Such might be associated with the housing or cabinet 102 with the main display device 104, or be associated with a top box or the like, as illustrated in FIG. 1.

The gaming machine 100 may be configured to present a wide variety of games. In a preferred embodiment, the game may be a bingo or bingo-based game. However, the games might be other types of games such as, but not limited to, Class III type games such as slot games and video poker games, or other Class II type games such as pull-tab games, lotto or instant lottery style games. In one embodiment, certain game outcomes may be designated as winning outcomes. Prizes or awards may be provided for winning outcomes, such as monetary payments (or representations thereof, such as prize of credits), or the like. As detailed below, one or more of the awards may have certain characteristics or features.

The gaming machine 100 also preferably includes one or more player input devices 108 (such as input buttons, plunger mechanisms, a touch-screen display, joystick, touch-pad or the like) that may be utilized by the player to facilitate game play. Also included in the player input devices 108 is a means for accepting monetary value. As illustrated in FIG. 1, a coin accepting mechanism 112 may be provided for accepting coins and a currency or bill acceptor 114 may be provided for accepting cash or paper currency, or a ticket reader may be provided for accepting and reading tickets or other representations of cash or currency. It is contemplated that other mechanisms may be provided for accepting a payment, such as credit card, ticket readers or input devices whereby a player may have funds paid from a remote account.

In one preferred embodiment, the gaming machine 100 includes a microprocessor or controller (not shown) for controlling the gaming machine, including receiving player input and sending output signals for controlling the various components of the machine 100 (such as generating game information for display by the display 104). The controller may be arranged to receive input such as a purchase/bet signal when a purchase/bet button is depressed, and a currency insert signal when a player inserts bills or coins. The controller may be arranged to send signals for determining winning combinations, for causing the coin hopper/dispenser to pay winnings, and to cause the display to display winning amount information. In addition, the controller is preferably arranged to determine if a round of game play has resulted in a win, and if so, the prize to be awarded to the player for that win.

The controller may be configured to execute machine readable code or "software" or otherwise process information, such as obtained from a remote server. Software or other instructions may be stored on a memory or data storage device. The memory may also store other information, such as pay table information. The gaming machine 100 may also include one or more random number generators for generating random numbers for generating random game outcomes, or such might be located remotely. For example, if the gaming machine 100 is a stand-alone machine configured to present a slot game or a video poker game, the random number generator(s) might be located at the machine. However, if the gaming machine 100 is used to present server-based or networked games, such as bingo games, the random number generator(s) might be located at the server.

In operation, the player may initiate game play by providing value. In the case of a bingo game, this may comprise purchasing one or more bingo cards. In other types of games, this may comprise placing a wager. The purchase or wager is made by activating one of the player input devices 108 such as a one credit button 116 which places a single credit purchase or wager or a max credit button 118 which places a maximum purchase or wager for that round of game play. The maximum purchase or wager is commonly defined as playing or betting an amount comprising a multiple of the value of a single purchase or wager up to a predefined upper purchase or bet limit or threshold. When the player actuates either the one credit button 116 or the max credit button 118, a wager is placed or purchase is made in that amount and the player's credit base is decreased by the number of credits wagered. The player's remaining credit base is typically displayed to the player by way of the display device 104. Upon making a purchase or placing a wager, the game may begin automatically or the player may join a game already in progress, or the player may initiate the game by activating another player input device, upon which the gaming machine 100 presents one or more game elements which are used to determine if the player has received a winning combination.

The gaming machine 100 generally includes a means for awarding a player a prize or winnings accumulated during game play. When a player obtains a winning outcome, the player is preferably paid prizes or awards in the form of stored credits, the amount of which is indicated to the player on the display 104. A "cash out" button may be provided for permitting a player to be paid the winnings or redeeming any credits initially paid into the gaming machine 100. The term "cash out" is used herein to define an event initiated by the player wherein the player receives a number of coins or currency that is equivalent to the value of the player's accrued credit base.

Typically when a player cashes out, the gaming machine 100 is configured to dispense a media or voucher, such as via a printer 114, which represents the cash-out value. The player may utilize this voucher at other gaming machines or convert the voucher to currency, such as at a cashier's station. However, depending upon the configuration of the gaming machine 100, the player might receive a cash or coin disbursement. For example, the gaming machine 100 might be configured to activate a coin hopper or coin handling device (not shown) which physically counts and delivers the proper number of coins to the player. The coin handling device is commonly configured to transport coins from a supply source (hopper or bin filled with coins) to a coin tray 124 or payout receptacle where the player physically receives the coins.

As indicated above, the gaming machine 100 may be configured as a stand-alone device, such as when the machine is configured to present a slot game or a video poker game. In other instances, however, the gaming machine 100 may be a server-based or networked machine. For example, the gaming machine 100 may be configured to obtain game code or game outcome information from a remote server. The gaming machine 100 may also communicate with a remote accounting server and/or player tracking server, as is well known in the art. As indicated below, a preferred embodiment of the invention is a bingo game which involves two or more players. In such a game, each player may play the bingo game on a different gaming machine 100. Each gaming machine 100 may communicate with a central server 130. The central server 130 may generate game information which is provided to the gaming machines 100 which are in communication therewith.

It will be appreciated that the gaming machine and system described and illustrated in FIG. 1 is only exemplary of an environment for a game of the invention. For example, it is possible to implement the wheel events or features via other types of gaming devices, such as hand-held devices and computing devices such as home and laptop computers, including in an on-line, web-based environment. It is also possible to implement the game in non-electronic environments. For example, relative to a bingo game, physical printed cards could be distributed to players.

In accordance with the invention, the gaming machine 100 may be configured to implement or include a wheel event or feature. The wheel event may be presented in various manners. In one embodiment, the gaming machine 100 may include one or more physical wheels, or it might be configured to display a video or electronic representation thereof, either via the main display or one or more secondary video displays. For example, the gaming machine 100 might include the main display 104, such as for displaying bingo game information. The gaming machine 100 might also include a wheel or a second video display for displaying a video representation of a wheel. As illustrated in FIG. 1, such a secondary video display might be located in a top box, whereby main game information is shown on the main display 104 and the wheel event is shown via the top box display. In another configuration, the main display 104 of the gaming machine 100 might be configured to display main game information, such as bingo game information, and at one or more times, a video representation of one or more wheels.

In the description below, various wheel events or features will be described primarily with reference to a video representation or implementation. It will be appreciated, however, that various of the features thereof may be implemented in a mechanical or electro-mechanical wheel format.

Figure 2A:
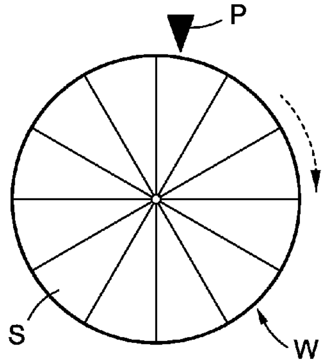
FIGS. 2A and 2B illustrate a first embodiment wheel event or feature in accordance with the invention.
Figure 2B:
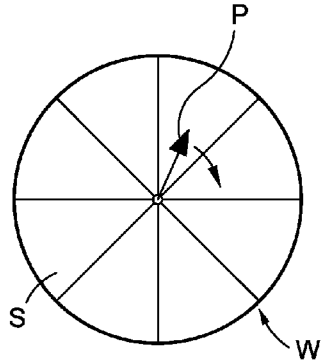

In one embodiment of the invention, as illustrated in FIG. 2A, one or more wheels are used to indicate one or more awards. For example, a wheel W might be divided into a plurality of segments or spaces S. The number and shape of those spaces S may vary. Preferably, the outcome of a wheel event is the selection of one or more of the spaces and an award associated therewith. Preferably, the selection is illustrated or represented by motion or movement and then the cessation of such motion or movement. For example, a selection event might comprise the wheel spinning and then stopping relative to a pointer P as indicated in FIG. 2A, or the movement and then stopping of a pointer P relative to the wheel W as illustrated in FIG. 2B (the pointer might comprise a physical element or displayed element, and might also comprise highlighting or other manner of displaying a selected segment). The segment which aligns with the pointer when the wheel or pointer stops moving may be deemed to be a selected segment. In some embodiments, more than one segment may be selected. Of course, when the wheel is a video representation, the movement of the wheel, pointer or the like is represented graphically via the video display.

At one or more times, the segments of the wheel preferably bear one or more indicia or symbols. The indicia or symbols are preferably used to designate various awards, as detailed below. The awards might be displayed directly or might be indicated by reference. For example, awards might comprise credit or win values (such as 2 credits, 500 credits, etc.); jackpot symbols; multiplier values; additional free spins of the wheel(s); one or more free games (for play of the base game); or other cash, prizes, etc.

Figure 3A:
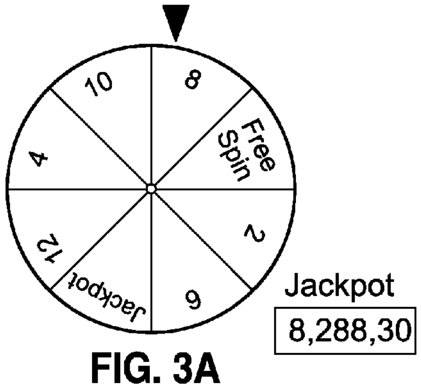
FIGS. 3A and 3B illustrate a second embodiment wheel event or feature in accordance with the invention.
Figure 3B:
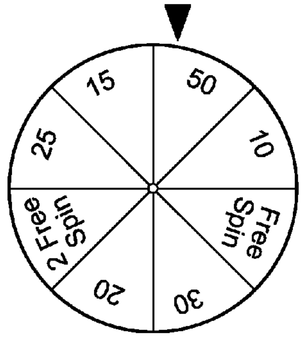

One wheel feature of the invention comprises the use of wheels having different associated values. The values may vary depending upon various criteria. For example, a player playing a wagering game might be permitted to place wagers of varying amounts. Depending upon the amount wagered, the wheel used in a wheel event or feature comprising the game or associated with the game, might vary. In one embodiment, the values associated with segments or portions of each wheel might vary depending upon the amount wagered. As one example, for wagers of a first amount or range of amounts, a wheel might have segments displaying win values of 2, 4, 6, 8, etc., as illustrated in FIG. 3A. For wagers of a second amount or range of amounts higher than the first amount, a wheel might have segments displaying larger win values, such as 10, 15, 20, etc., as illustrated in FIG. 3B. In this manner, a player is enticed to place a larger wager, knowing that in such instances the awards associated with the wheel(s) will be higher.

In another embodiment, the particular wheel or wheels which are used in a wheel event may depend on other criteria, such as base game outcomes or the like. For example, five different wheels (or the same wheel having different award configurations) may be available for presentation in a wheel event which is triggered by or associated with a base game. The particular one of those five wheels which is used or displayed in the wheel event may depend upon the outcome of the base game, wherein different outcomes of the base game are associated with the selection of different ones of the wheels. For example, a base game might comprise a slot-type game where different symbols are displayed, potentially including one or more trigger symbols. The appearance of one trigger symbol in the base game may be linked to the use of a first wheel from the set of wheels, the appearance of two trigger symbols may be linked to the use of a second wheel from the set of wheels, and so on (for example, the game might have a maximum capability of displaying five trigger symbols and thus have five wheel options). In a preferred embodiment, each of the wheels in the set of wheels has different characteristics. In one embodiment, the wheels may display different values or awards with their wheel segments. In a preferred embodiment, one or more of the values or awards are higher for "higher ranked" wheels. In the example described above, the first wheel might have values which have an average of 50 credits, the second wheel might have values which have an average of 100 credits, etc. In this manner, when a player receives a higher value win or outcome in the base game, the wheel event uses a wheel which presents the player with potentially higher bonus winning amounts.

In addition, the wheels might have other characteristics. For example, a first wheel (such as triggered by a first number of triggers) might have segments with associated credit values. A second wheel (such as triggered by a second number of triggers) might have segments with numbers of free spins. A third wheel (such as triggered by a third number of trigger) might have segments with progressive jackpot values. It will, of course, be appreciated that a variety of different characteristics (such as different awards, types of awards, events or the like) may be utilized.

Of course, this variation might employ the use of more than one wheel. For example, if a player receives a first triggering base game outcome, the player might be presented with one wheel in the wheel event. If the player receives a second triggering base game outcome, the player might be presented with two different wheels in the wheel event, wherein the player has the opportunity to select which wheel they wish to use in the event.

Other events or outcomes might be used to determine the one or more wheels which are utilized in the wheel event and/or the characteristics of the wheel(s). Those events might comprise other than base game outcomes, including random selection or triggers.

As indicated, a wheel event outcome might simply result in the indication of a credit win or award. Such an outcome might entitle the player to an award of the number of credits indicated.

Figure 4A:
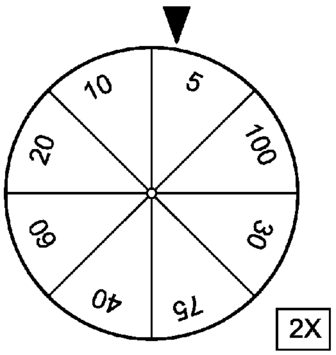
FIGS. 4A and 4B illustrate a third embodiment wheel event or feature in accordance with the invention.
Figure 4B:
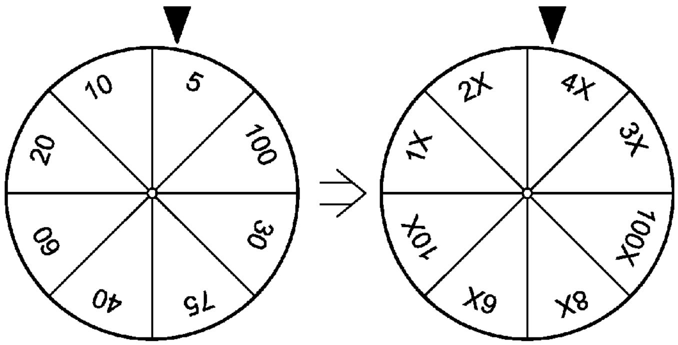

A wheel event outcome might result in a credit win or award with a bonus multiplier. The bonus multiplier might be indicated in various fashions. For example, the bonus multiplier might be indicated by a secondary value, such as a number of credits wagered or the like, as illustrated in FIG. 4A. The bonus multiplier might also be indicated by a second spin of the wheel or by a multiplier value revealed under the credit win of the original wheel spin, as illustrated in FIG. 4B. The bonus multiplier might also be indicated by a spin of one or more secondary wheels. For example, a credit win of 1000 credits might be multiplied by a multiplier value of 4 (4×) for a total award of 4000 credits. It is also possible to use multiple multipliers (such as a first multiplier which multiplies an original credit win, which is then multiplied by a second multiplier).

As illustrated in FIG. 3B, a wheel event outcome might result in an award of a jackpot. For example, a game or gaming system might offer a jackpot of a fixed value or a varying (progressive) value. A wheel might include one or more spaces designating a jackpot win. In the event one of those spaces is selected, the corresponding jackpot may be awarded to the player, as illustrated in FIG. 3A.

A wheel event outcome might result in an award of additional wheel spins. For example, the wheel event outcome might comprise selection of a space or segment indicating "10 spins". The player may then have the opportunity to spin the wheel 10 more times for additional awards.

A wheel event outcome might result in an award of free games or free games with multiplier values. As detailed below, a wheel feature might be associated with a main or base game that offers awards for winning outcomes. In the event the wheel feature is activated and a player obtains a free game outcome, the player may be permitted to play the main or base game the number of times indicated without having to place a wager and with the opportunity for winning outcomes of that main or base game. In the event the award includes a multiplier value, awards of the main or base game for such free games may be multiplied by the multiplier value, thus enhancing the total awards.

In one embodiment, a wheel event might result an award of one or more free/bonus games or spins where the multiplier increases. For example, a player might be awarded free games or spins of an underlying slot game where all winning awards for a first free/bonus game are multiplied by 1×, the awards for a second game are multiplied by 2× and so on. The number of free/bonus games might be indicated to a player at the time they are won or the player might continue playing until a termination symbol is displayed. Such a feature may be applied to free/bonus wheel spins, where credit awards are multiplied for each free/bonus spin in increasing succession.

One or more wheel events or features might include multiple wheels. The wheels might be separate or might be embedded. For example, a wheel feature might comprise a first wheel and a second wheel. The first and second wheels may be displayed and/or activated at the same or different times. In one embodiment, the first and second wheels might be used together to define an award. For example, a first wheel might spin to indicate a credit award, such as 100 credits. A second wheel might spin to indicate a multiplier value, such as 4×. Of course, three or more wheels might also be used in such situations.

In another embodiment, a player might be permitted to select one or more wheels to spin from a set of wheels. For example, a player might select a particular wheel to spin from a set of two or more wheels. In such a configuration, one or more spaces or segments of the wheels might be blank or display symbols or other indicia which do not disclose some or all of the potential awards associated with that wheel. Alternatively, the wheels might display varying awards. For example, a first wheel might display credit values like 2, 4, 6, and 1000 credits, while the second reel displayed values like 50, 100, 150, 200 credits. The player then must elect to spin the first wheel for a chance to win 1000 credits, but at the same time risk receiving a low award, or elect to spin the second reel without the chance to win a very high award, but with a guarantee of winning at least 50 credits. In one embodiment, the outcome of a player selected wheel might affect other wheels. For example, a player might select one wheel which has an outcome of a multiplier. This might cause the other initially non-selected wheel or wheels to be visible or be used to generate a credit value that is multiplied by the multiplier value.

Figure 5:
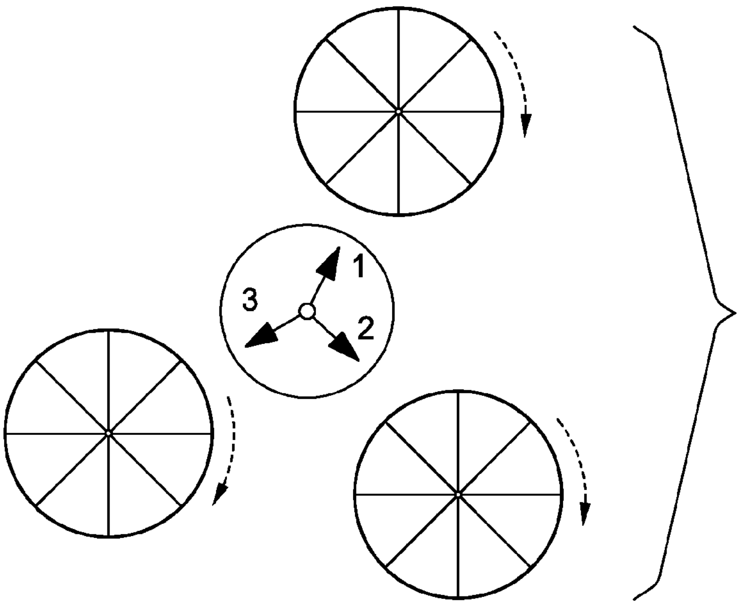
FIG. 5 illustrates a fourth embodiment wheel event or feature in accordance with the invention.

In one embodiment, a central wheel and/or central pointer may be used to designate outcomes of one or more other wheels. In a first example, a number of pointers may be centrally located between two or more wheels. The pointers may rotate and point outwardly towards the wheels or the wheels may rotate relative to the pointers. The positions of the pointers may designate outcomes of spins of those wheels, as illustrated in FIG. 5. In a second example, a central wheel may have one or more pointers that designate outcomes of that wheel and one or more wheels located adjacent the central wheel. A single spin may then designate outcomes of all of the wheels.

Figure 6:
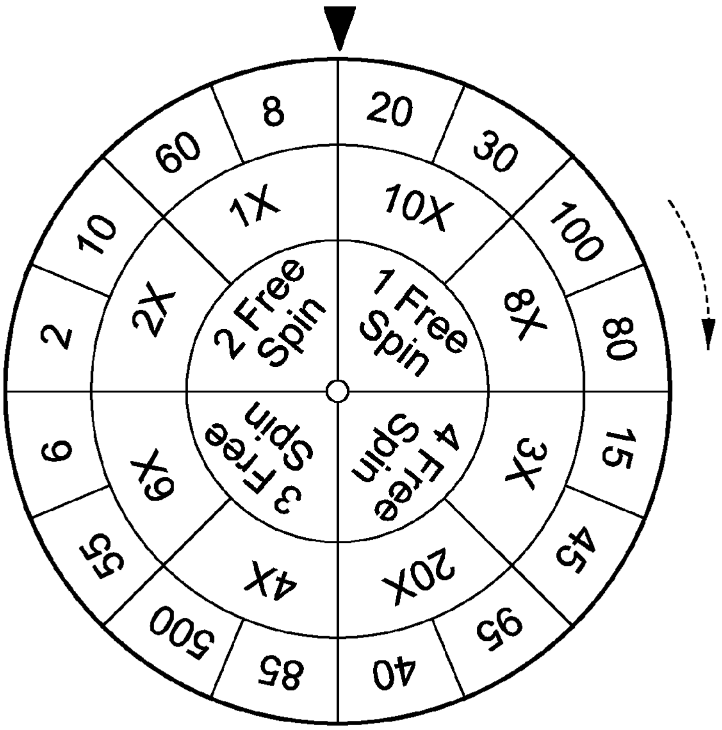
FIG. 6 illustrates a fifth embodiment wheel event or feature in accordance with the invention.

In one embodiment, multiple wheels may be embedded, as illustrated in FIG. 6. For example, the wheels may be represented as concentric areas about a central area. The various wheel areas may rotate, such as relative to one another, including at different speeds and/or directions. Each wheel area may have a plurality of segments containing one or more indicia, such as awards, symbols, etc. The number of segments of the wheel areas may vary. For example, an interior wheel area might have 4 segments, while a middle area might have 8 segments, and an outer area might have 12 segments. The types of awards or symbols associated with the wheel areas might vary. For example, an interior area might designate multipliers and an outer area might designate a credit award. Various wheel selection features may be utilized with such an embedded wheel. For example, the concentric wheel areas could spin relative to a single pointer, as illustrated in FIG. 6 (and they could spin the in same direction or in different directions from one another). One or more central pointers could move relative to the wheel areas, such as where one pointer is provided relative to each of the areas.

In one embodiment, the result of a wheel event might be displayed in various other fashions than by rotating a wheel and pointer relative to one another. For example, a wheel might start with 8 segments. The segments may indicate credit awards or such might be indicated after the wheel begins to spin. The segments might then collapse on one another, with the credit values aggregating. For example, the 8 segments might first collapse into 4 segments and then 2 and then a single segment. Once the wheel collapses to a single segment bearing an aggregated credit value, that value would represent the outcome of the wheel spin.

It will be appreciated that the various features of the invention could be applied to such an embedded or nested wheel as well.

In embodiment, a wheel event includes two wheels. A first wheel has segments bearing numbers. A second wheel is initially blank. The outcome of a spin of the first wheel indicates a number of segments, such as 8. The second wheel then opens into 8 segments bearing symbols designating awards or awards. The player then spins the second wheel for an outcome. In another embodiment, the second wheel has segments indicating values and the outcome of the first wheel spin increases one or more values by a multiplier. For example, if the outcome of the spin of the first wheel is 3×, then all of the award values of the second wheel, one or more of the lowest values, or one or more of the highest values might be increased by 3× their original value.

As indicated above, there might be interaction between two or more wheels, such as a displayed interaction where an event on one wheel affects another wheel. In addition, in another embodiment, there might be interaction between a wheel event and another event, such as a displayed base game event. For example, a base game event might comprise a slot game or a displayed slot event representing a bingo game outcome. A wheel event might comprise selection of a wheel outcome including one or more special symbols. In the event such a symbol is selected (such as by spinning the wheel and stopping on a segment containing such a symbol), the symbol may appear to move to the base game. For example, a gold coin might move from a displayed wheel of a top box display downwardly and appear on a main display showing slot reels. The gold coin might be displayed as part of that game, such as by displacing a symbol thereof to serve as a wild symbol, a multiplier or the like.

In one embodiment, the outcome of a wheel event might trigger another game or event and/or determine the characteristics or features of another game or event. For example, as described above, instead of a wheel event simply awarding a credit award, the wheel event might result in the award of one or more free games. These free games might comprise secondary or bonus games or occurrences of the base game, such as free or reduced credit/wager play of instances of a base game.

Figure 7:
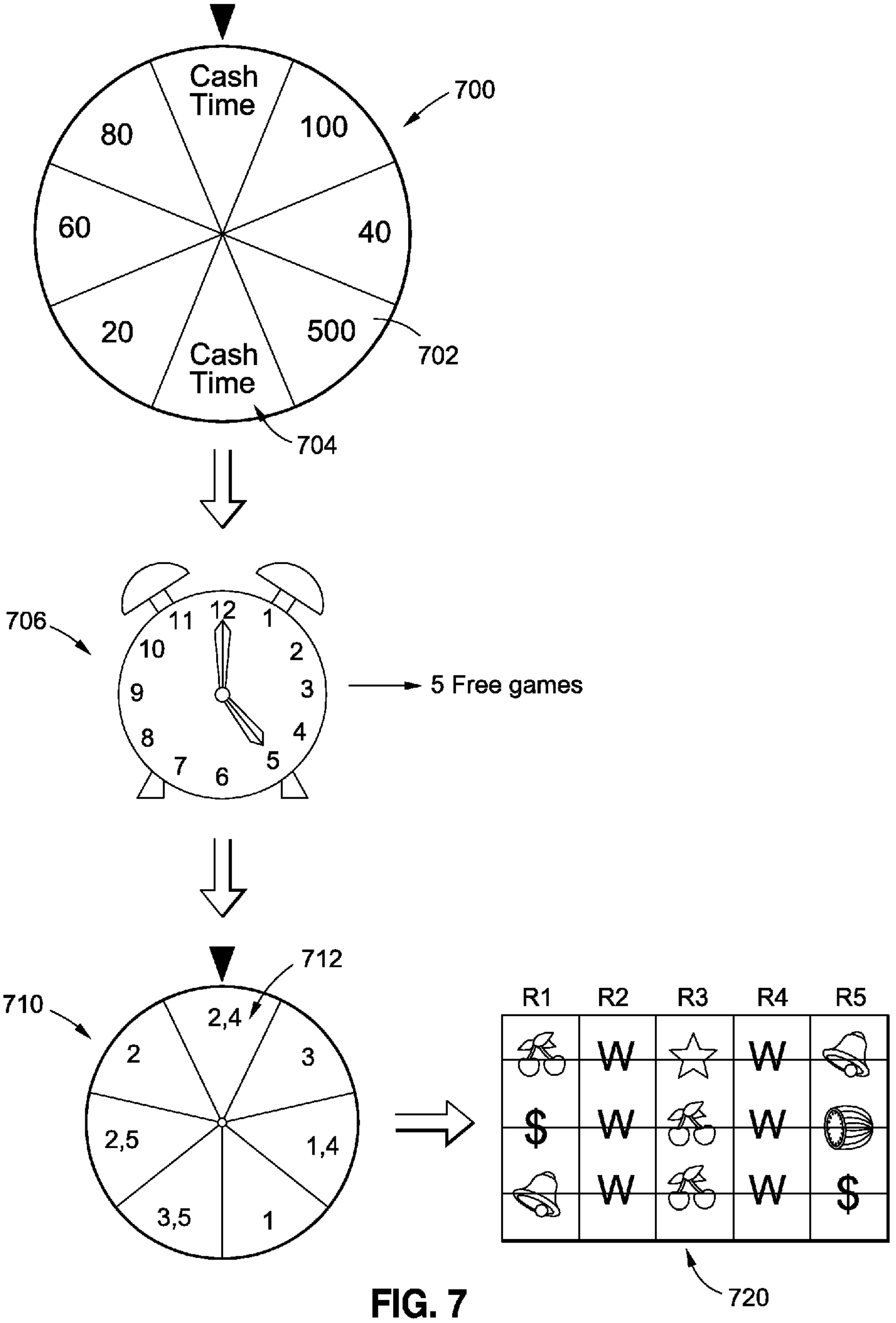
FIG. 7 illustrates a sixth embodiment wheel event or feature in accordance with the invention.

One example of such a feature will be described with reference to FIG. 7. As illustrated, a wheel 700 might include segments 702 which display various awards, one or more of which may comprise credit or cash awards. The wheel 700 might also include other types of awards, such as the illustrated "Cash Time" award 704.

In one embodiment, the Cash Time award 704 results in the award of one or more free plays of the base game. The number of free games may be determined or presented to the player in various manners. For example, in one embodiment, if the outcome of the first wheel event is a Cash Time award 704, then a second event might be displayed by which the number of free games is selected or presented (alternatively, the number of games might be randomly determined or be designated by the initial wheel event). Such might comprise a wheel event or another entertaining display or the like. In one embodiment, a clock 706 might be displayed wherein the hands of the clock are used to determine or display the number of free games (for example, the hands of the clock may move and the ending position of the hour hand (between 1 and 12) may determine the number of free games (between 1 and 12).

In one embodiment, wheel events might be used to determine other game features. For example, in a game of Cash Time, a player may be awarded free game play of a base slot-type game. The slot game may include the display of a number of reels, such as 5 reels (where in each reel is capable of displaying one or more symbols and particular combinations of symbols are designated as winning outcomes). In one embodiment, a wheel event may determine a number of reels which are designated as "wild". For example, referring to FIG. 7, a second wheel 710 might be displayed, wherein one or more of the segments designate reels 712. The outcome of the wheel event via such a wheel might designate which one or more reels 712 will be treated as wild in the free games. For example, the outcome of the second wheel event might comprise the selection of a segment which displays "2/4". Such a selection may designate that the symbols which are displayed by reels 2 and 4 are treated as wild (shown as "W" symbols in the illustrated example reel set 720) during play of the free games.

Of course, the above comprises just one example of how the outcome of a wheel event may be used to determine or display a feature or parameter which is used in another event, such as a free game, a later base game, a later bonus event or the like. For example, a wheel event might be used to determine abuse hand of video poker, that certain cards are wild, that certain symbols (as opposed to reels) in a slot-type game are wild, that certain reels of a slot-type game are locked or may be locked, or the like.

As indicated herein, the wheel event may determine an event or may simply display the outcome of an event. For example, one or more wheels may be used to determine an event, such as by rotating the wheel and/or, a pointer/selector, wherein the stopping position(s) determine the actual outcome of the event. However, as described below, a wheel may simply be used as an entertaining display of an outcome of another event, such as a bingo game. Thus, relative to the Cash Time game described above, the first wheel event, alarm clock display and second wheel event, along with the associated free games, may all comprise entertaining displays associated with a base game win (wherein even the base game may be represented via an entertaining display, such as where a slot-type game is used to display the outcome of a bingo game).

As described herein, a wheel may have one or more segments which have associated values or other awards. Thus, when a wheel is described herein as having one or more segments having an associated award, it is possible for the wheel to include segments which do not have an associated award. The segments which do not have a particular associated award may be treated as having an award of nothing or zero. For example, a wheel might have 10 segments. Only 6 of those segments might have associated awards, whereby the player may have a 4 in 10 chance of hitting a segment which has no award.

Various of the wheel configurations or features might be combined in various configurations.

As indicated, the various wheel features may be implemented with various gaming machines and with various games. For example, the wheel events or features could be implemented as a primary game. For example, a player could place a wager and then a wheel could be displayed. A random number generator might select one of the segments or spaces of the wheel and a video representation of the wheel could be displayed wherein the wheel spins and stops at the selected segment. The award corresponding to that segment could then be awarded. The wheel events or features could also be implemented to display bonus outcomes. For example, one or more outcomes or events of a base or main wagering game could trigger a wheel feature or event. Such an event could be used to generate the main game outcome or a bonus outcome in addition to winnings of the main/base game. In a preferred embodiment, the one or more wheel features may be used as an entertaining display of all or a portion of the results of a main game. For example, in one preferred embodiment, a base game may comprise a bingo game. The results of such a game may be displayed by a wheel event or feature of the present invention.

As one example, in a step S1 a player purchases a bingo card or places a wager. As indicated above, such may comprise a player providing a number of credits at a gaming machine. This step might also comprise a player providing monies to an operator. Relative to the game of bingo, a player may be permitted to purchase bingo cards having different values, such as "base" value cards (such as "one credit" cards) or higher value cards, such as "max" value cards (purchased for two or more credits). The particular purchase prices or values of the cards may be determined by the operator.

One or more bingo or game cards are assigned to the player in a step S2. In one embodiment, a player might purchase two or more cards, and such cards may be assigned to the player. The game cards may be provided electronically. For example, relative to the system illustrated in FIG. 1, upon a player placing a wager, the server 130 may assign a game card to a player and transmit game card information to the gaming machine 100 that the player is playing. This game card may be displayed to the player at the gaming machine.

The bingo or other game card may have various configurations. Preferably, the game card bears numbers or other designations. For example, the card might comprise a bingo card having numbers arranged in a 5 by 5 grid (totaling 25 numbers arranged into five rows and five columns). The numbers on the cards might comprise numbers selected from the group of numbers 1-75, which numbers are randomly assigned to the locations of the card. In some embodiments, numbers from the group 1-15 are randomly selected for the 5 spots of the first column, numbers from the group 16-30 are randomly selected for the 5 spots of the second column, etc. for each card. One card could have the numbers 1-75 may be associated with columns designated "B" "I" "N" "G" and "O" and balls or objects may be similarly marked (such as B5; N42, etc.)

In one embodiment, certain criteria may have to be satisfied before a game can be initiated. For example, in a bingo-type game, two or more players may be required before a game can begin. Thus, two or more players may be required to purchase game cards or place wagers before the game begins.

When the game begins, one or more objects which are similarly numbered or designated as the game cards are drawn or selected, as in a step S3. In one embodiment, objects may comprise bingo balls, either in electronic or physical form, which are numbered with the numbers one to seventy-five (1-75). The balls or other objects may be physical objects or may be electronically represented.

In one embodiment, the objects may be selected in one or more sets or "draws". For example, in one embodiment of a game, there is a first single ball draw of thirty (30) numbers or designations which may be represented as balls. In another embodiment, there is a first draw of one (1) number or designation and then a second ball draw of twenty-nine (29) numbers or designations.

In the game of bingo, the numbers or other designations associated with the objects are compared to the numbers or designations on the cards to determine matches and potential wins, as in a step S4. It is noted that the process of matching may require input from the player (such as requiring a player to place a "daub" button), and may be required relative to each group or draw of numbers or designations (for example, the player may be required to "daub" after a first single numbers or designation is drawn and then again after the 29 additional numbers or designations are drawn, relative to the example ball draw indicated above). The comparison may be accomplished automatically or manually. For example, a player might select a "daub" button to affect the gaming machine's marking of all matches of drawn or called numbers or designations to those on each of their cards. In other embodiments, such might occur automatically or the player might be required to mark each match.

In one embodiment, one or more predetermined game outcomes are determined to be winning outcomes. In a game of bingo, the winning outcomes may be particular patterns of matches of the numbers or other designations on a card, such as a diagonal, horizontal or vertical line of player numbers, an "X" pattern or the like. The one or more predetermined winning combinations may have prizes associated therewith, as in the step S4. One or more winning combinations may be deemed "game ending" patterns in that once received, they cause the game to terminate or bring the game to an end, as in a step S5 (the other winning outcomes may be termed "interim" winning outcomes or patterns, since they result in win to the player, but do not end the game). As part of the determination of winning outcomes, associated prizes may be awarded.

Thus, during the course of game play, one or more players may receive interim winning outcomes based upon matches of their card(s) to the one or more initial ball draws. In addition, one or more players might receive the game ending pattern based upon the one or more initial ball draws. As indicated, one or more additional balls may be drawn until a game-ending pattern is received.

In one embodiment of the invention, one or more awards are associated with the designated winning outcomes. In a preferred embodiment, one or more of the awards are represented via a wheel feature. For example, a bingo game outcome might comprise a win of 1000 credits. A wheel may then be displayed on a video display of the bingo game machine. The wheel may have one or more of the features described above. The outcome of the wheel feature or event may be predetermined to be a display of an award of 1000 credits, and thus comprise a display of the amount won playing the bingo game. For example, the wheel event might comprise a spin of a wheel having segments bearing various awards, such as 50, 500, 1000, 2000, etc. The outcome of the wheel spin might comprise selection of the "1000 credits" space.

The wheel feature might be used as a bonus event display of such a predetermined outcome. For example, a bingo game outcome may have as its primary representation a slot game wherein various slot symbols are displayed. In the event one or more particular symbols are displayed, a wheel "bonus" may be activated. For example, the slot symbols may include "wheel bonus" symbols. The slot display may include five reels of symbols arranged in 3 columns. If a wheel bonus symbol appeared anywhere in the first, third and fifth column, the "wheel bonus" might be triggered. That wheel bonus might result in an outcome corresponding to the bingo game win (such as a 1000 credit award).

One example of an implementation of the game will now be described. In one embodiment, the invention may be implemented as a bingo game. In such a game, players may purchase one or more bingo cards. Of course, the format of the bingo card, including the number of player numbers, may vary. The card might be a traditional card of 5 columns each associated with the letters B-I-N-G-O, each column having 5 numbers. As indicated above, in one embodiment, the game preferably does not begin until at least two players purchase cards. However, after the game begins, those same players may purchase additional cards or other players may enter the game by purchasing one or more cards.

Once the game begins, bingo balls which are similarly numbered to the cards are selected. The bingo balls are preferably randomly selected, such as by a game server, by a bingo ball blower or the like. As indicated above, one or more bingo balls may be selected in one or more groups.

Matches of bingo numbers to the player's bingo card may be indicated (such a step may be performed automatically or may be accomplished by the player, such as by daubing the matches or requesting that a gaming machine daub the matches). Prizes may be awarded for any winning outcomes. For example, a prize may be awarded for matching the numbers at two of the corners of the bingo card. Such a winning outcome might comprise an interim winning outcome, whereby the game continues on until a game winning outcome is received. As the game proceeds, additional bingo balls may be drawn and called for matching to the bingo cards which are active in the game.

The player may be awarded winnings for the "two corners" winning outcome. As one example, this award might comprise an award of 100 credits. The award may be represented by a base slot game. This game might include the spinning of reels of symbols. A result of a spin of the symbols might comprise symbols representing 50 credits and a wheel spin. The slot game representation might be presented on a main game display. The wheel might be shown on a secondary video display, such as in a top box above the gaming machine. The player might be prompted via the main display to spin the wheel. Upon input, the wheel might spin. The wheel event preferably results in a displayed award of 50 credits. In this manner, the combined results of the main slot representation and the secondary wheel representation comprises 100 credits. In this manner, these representations convey to the player their 100 credit bingo win via a sequence of entertaining non-bingo events.

Of course, the above represent examples of bingo games and examples of wheel features that may be used with those games. The wheel events or features could be used with other games, including bingo games of other types.

When the game is presented via a gaming machine, such as by the system illustrated in FIG. 1, various of the steps of the invention may be performed by the gaming machine and/or server. For example, the game server may be configured to generate game cards, randomly select balls or game numbers, track and display matches of game numbers to game cards, and confirm whether a player's eligibility for a win. In such a configuration, steps of the game might be implemented via machine readable code which is stored at a memory of the gaming machine and executed by the controller of the gaming machine.

In accordance with the invention, numerous advantages are realized. Most importantly, new and exciting wheel features or events are described. When used in conjunction with a wagering gaming machine or wagering game, these wheel features or events are enticing to players. This has been found to result in greater levels of player play of the games.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A wheel event for a wagering game presented on a gaming device having at least one display, the wheel event comprising the steps of:

designating at least two outcomes of a base wagering game as wheel event triggering outcomes;

presenting said base wagering game on the gaming device by displaying base wagering game information;

if an outcome of said base wagering game is a first wheel event triggering outcome:

displaying via said at least one display a first wheel having a plurality of segments, one or more of said segments having at least one associated first award;

initiating a wheel segment selection event relative to said first wheel; and displaying a selected segment and its associated first award; and if an outcome of said base wagering game is a second wheel event triggering outcome which is different than said first wheel event triggering outcome:

displaying via said at least one display a second wheel having a plurality of segments, one or more of said segments having at least one associated second award;

initiating a wheel segment selection event relative to said second wheel; and displaying a selected segment and its associated second award.

2. The wheel event in accordance with claim 1 wherein said base wagering game comprises a bingo game.

3. The wheel event in accordance with claim 2 wherein said base wagering game information comprises slot-game symbols.

4. The wheel event in accordance with claim 1 wherein one or more of said first and second awards comprise credit values.

5. The wheel event in accordance with claim 4 wherein an average value of said credit values comprising said first awards is different than an average value of said credit values comprising said second awards.

6. A wheel event for a wagering game presented on a gaming device having at least one display, the wheel event comprising the steps of:

presenting said base wagering game on the gaming device by displaying base wagering game information;

determining if a triggering event has occurred, and if so:

displaying via said at least one display a first wheel having a plurality of segments, one or more of said segments having associated awards, at least one of said awards comprising a free play award comprising the play of one or more base games without a wager;

initiating a wheel segment selection event relative to said first wheel; and displaying a selected segment and its associated award; and if said award is a free play award:

displaying via said at least one display a second wheel having a plurality of segments, one or more of said segments of said second wheel designating at least one base game feature;

initiating a wheel segment selection event relative to said second wheel; and displaying a selected segment and its associated at least one base game feature; and presenting said one or more base games without a wager, wherein said base games are implemented with said at least one base game feature of said selected segment.

7. The wheel event in accordance with claim 6 wherein at least one base game feature comprises a number of wild reels relative to a base game comprising a slot game having a plurality of reels.

8. The wheel event in accordance with claim 6 further comprising the step of determining a number of free games if said award is a free play award.

* * * * *